(12) United States Patent
Motgi et al.

(10) Patent No.: US 12,481,781 B2
(45) Date of Patent: Nov. 25, 2025

(54) SYSTEM AND METHOD FOR MANAGING ACCESS TO DATA STORED IN A DATA MANAGEMENT SYSTEM

(71) Applicant: Dell Products L.P., Round Rock, TX (US)

(72) Inventors: Prem Pradeep Motgi, Austin, TX (US); Dharmesh M. Patel, Round Rock, TX (US); Manpreet Singh Sokhi, Santa Clara, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/458,385

(22) Filed: Aug. 30, 2023

(65) Prior Publication Data

US 2025/0077698 A1    Mar. 6, 2025

(51) Int. Cl.
 *G06F 21/62*    (2013.01)
 *G06F 16/2457*  (2019.01)
 *G06F 16/248*   (2019.01)

(52) U.S. Cl.
 CPC ...... *G06F 21/6227* (2013.01); *G06F 16/2457* (2019.01); *G06F 16/248* (2019.01)

(58) Field of Classification Search
 CPC ........................... G06F 16/2457; G06F 16/248
 See application file for complete search history.

(56) References Cited

U.S. PATENT DOCUMENTS

| | | |
|---|---|---|
| 5,649,060 A | 7/1997 | Ellozy et al. |
| 5,821,871 A | 10/1998 | Benzler |
| 6,606,620 B1 | 8/2003 | Sundaresan |

(Continued)

FOREIGN PATENT DOCUMENTS

| | | |
|---|---|---|
| CN | 202058147 U | 11/2011 |
| CN | 115292285 A | 11/2022 |

(Continued)

OTHER PUBLICATIONS

Page, Sébastien, "How to move your Health data from one iPhone to another," iDB, Web Page <https://www.idownloadblog.com/2016/10/13/health-data-importer-makes-moving-your-health-data-from-one-iphone-to-another-a-breeze/> accessed on Oct. 30, 2022 (9 Pages).

"MyChart," Web Page <https://www.mychart.org/> accessed on Oct. 30, 2022 (6 Pages).

Xu, Jie et al., "Federated learning for healthcare informatics," Journal of Healthcare Informatics Research 5 (2021): 1-19. (19 Pages).

(Continued)

*Primary Examiner* — Charles D Adams
(74) *Attorney, Agent, or Firm* — WOMBLE BOND DICKINSON (US) LLP

(57) ABSTRACT

Methods and systems for managing access to data in a data management system are disclosed. To manage access to data, data management system may limit the access to data stored within the data management system based on an identity of a requestor from which a request for a portion of the data is obtained. Data management system may identify an access control model usable to manage access to the data stored in the data management system based on topics associated with the identity of the requestor and relevancy of each topic. To identify an access control model, data management system may use the identity of the requestor to identify associated topics and topic rankings for the identified topics. Based on the identified access control model, data management may provide a response to the requestor to service the request for a portion of data.

20 Claims, 8 Drawing Sheets

(56) References Cited

U.S. PATENT DOCUMENTS

| | | |
|---|---|---|
| 6,721,713 B1 | 4/2004 | Guheen |
| 7,315,826 B1 | 1/2008 | Guheen |
| 8,117,235 B1 | 2/2012 | Barta |
| 8,255,386 B1 | 8/2012 | Annau et al. |
| 8,255,948 B1 | 8/2012 | Black et al. |
| 8,335,688 B2 | 12/2012 | Yegnanarayanan et al. |
| 8,412,521 B2 | 4/2013 | Mathias et al. |
| 8,495,720 B2 | 7/2013 | Counterman |
| 8,955,076 B1 | 2/2015 | Faibish |
| 9,009,844 B1 | 4/2015 | Corn |
| 9,031,839 B2 | 5/2015 | Thorsen et al. |
| 9,361,428 B2 | 6/2016 | Bessette |
| 9,571,890 B1 | 2/2017 | Diamondstein |
| 9,749,353 B1 | 8/2017 | Benskin |
| 9,754,209 B1 | 9/2017 | Kronrod |
| 9,781,097 B2 | 10/2017 | Grajek et al. |
| 10,042,993 B2 | 8/2018 | Beigi |
| 10,073,948 B2 | 9/2018 | Cohen et al. |
| 10,157,275 B1 | 12/2018 | Venkatasamy et al. |
| 10,169,599 B2 | 1/2019 | Fox |
| 10,462,142 B2 | 10/2019 | Pattar et al. |
| 10,521,572 B2 | 12/2019 | Nygate |
| 10,701,056 B2 | 6/2020 | Murthy |
| 10,896,681 B2 | 1/2021 | Aleksic et al. |
| 10,904,237 B2 | 1/2021 | Murthy et al. |
| 10,997,315 B2 | 5/2021 | Barday |
| 11,010,392 B1* | 5/2021 | Hirsch ............... G06F 16/2471 |
| 11,094,402 B2 | 8/2021 | Brown et al. |
| 11,217,331 B2 | 1/2022 | Vishnubhatla et al. |
| 11,405,189 B1 | 8/2022 | Bennison |
| 11,533,619 B1 | 12/2022 | Kahn |
| 11,550,842 B2 | 1/2023 | Clark |
| 11,631,401 B1 | 4/2023 | Nudd |
| 11,763,821 B1 | 9/2023 | McNair |
| 11,849,069 B1 | 12/2023 | Can |
| 12,118,121 B2 | 10/2024 | Brannon |
| 12,135,708 B2 | 11/2024 | Chermside |
| 2003/0046401 A1 | 3/2003 | Abbott |
| 2005/0160166 A1 | 7/2005 | Kraenzel |
| 2006/0007870 A1 | 1/2006 | Roskowski |
| 2008/0154961 A1 | 6/2008 | Dougall |
| 2008/0275701 A1 | 11/2008 | Wu et al. |
| 2009/0171692 A1 | 7/2009 | Zilberman et al. |
| 2009/0216746 A1* | 8/2009 | Aubin .................. G06F 16/254 |
| | | 707/999.005 |
| 2009/0328175 A1 | 12/2009 | Shuster |
| 2010/0121657 A1 | 5/2010 | Rosenberger |
| 2010/0169304 A1* | 7/2010 | Hendricksen ......... G06F 16/319 |
| | | 707/723 |
| 2011/0072233 A1 | 3/2011 | Dawkins |
| 2011/0131174 A1 | 6/2011 | Birch et al. |
| 2011/0307435 A1 | 12/2011 | Overell |
| 2012/0265771 A1 | 10/2012 | Suh |
| 2014/0181673 A1 | 6/2014 | Work |
| 2014/0201199 A1 | 7/2014 | Hajaj |
| 2014/0207885 A1 | 7/2014 | Baker et al. |
| 2014/0344288 A1 | 11/2014 | Evans |
| 2015/0101065 A1 | 4/2015 | Sullivan |
| 2015/0169574 A1 | 6/2015 | Bau et al. |
| 2015/0199268 A1 | 7/2015 | Davis et al. |
| 2015/0244706 A1 | 8/2015 | Grajek |
| 2015/0350210 A1 | 12/2015 | Thibadeau, Sr. |
| 2015/0356127 A1 | 12/2015 | Pierre et al. |
| 2016/0006839 A1 | 1/2016 | Sawazaki |
| 2016/0087976 A1 | 3/2016 | Kaplan |
| 2016/0164813 A1 | 6/2016 | Anderson |
| 2016/0231928 A1 | 8/2016 | Lewis et al. |
| 2016/0232159 A1 | 8/2016 | Parikh |
| 2016/0275158 A1 | 9/2016 | Baset |
| 2016/0306812 A1 | 10/2016 | McHenry et al. |
| 2016/0378760 A1 | 12/2016 | Braz |
| 2017/0013047 A1 | 1/2017 | Hubbard |
| 2017/0018026 A1 | 1/2017 | Rigdon |
| 2017/0161439 A1 | 6/2017 | Raduchel |
| 2017/0262164 A1 | 9/2017 | Jain |
| 2017/0344886 A1 | 11/2017 | Tong |
| 2017/0365101 A1 | 12/2017 | Samec et al. |
| 2018/0024845 A1 | 1/2018 | Card, II et al. |
| 2018/0068108 A1 | 3/2018 | Fish |
| 2018/0121502 A1 | 5/2018 | Prieur |
| 2018/0181560 A1* | 6/2018 | Qiao .................... G06F 16/248 |
| 2018/0189352 A1 | 7/2018 | Ghafourifar |
| 2018/0203612 A1 | 7/2018 | Kats et al. |
| 2018/0225345 A1 | 8/2018 | Gilder |
| 2019/0012931 A1 | 1/2019 | Candelore |
| 2019/0079855 A1 | 3/2019 | Dewitt |
| 2019/0279744 A1 | 9/2019 | Howley et al. |
| 2019/0297035 A1 | 9/2019 | Fox et al. |
| 2019/0325036 A1 | 10/2019 | Edge |
| 2020/0012800 A1 | 1/2020 | Karako |
| 2020/0042685 A1 | 2/2020 | Tussy |
| 2020/0043479 A1 | 2/2020 | Mont-Reynaud |
| 2020/0110882 A1 | 4/2020 | Ripolles Mateu et al. |
| 2020/0226216 A1* | 7/2020 | Marin .................... G06F 40/30 |
| 2020/0258516 A1 | 8/2020 | Khaleghi |
| 2021/0056131 A1 | 2/2021 | Ackermann et al. |
| 2021/0065203 A1 | 3/2021 | Billigmeier et al. |
| 2021/0256534 A1 | 8/2021 | An |
| 2021/0390196 A1 | 12/2021 | Lavine et al. |
| 2022/0019560 A1 | 1/2022 | Durairaj |
| 2022/0027859 A1 | 1/2022 | Daga |
| 2022/0078007 A1 | 3/2022 | Reddem |
| 2022/0131717 A1 | 4/2022 | Kwatra |
| 2022/0261152 A1 | 8/2022 | Jude et al. |
| 2022/0284090 A1 | 9/2022 | Taylor |
| 2022/0293087 A1 | 9/2022 | Kumar |
| 2022/0301548 A1 | 9/2022 | Wintrode |
| 2022/0334719 A1 | 10/2022 | Thrane |
| 2022/0335426 A1 | 10/2022 | Rapowitz |
| 2022/0366131 A1 | 11/2022 | Ekron |
| 2023/0020703 A1 | 1/2023 | Padinjaruveetil |
| 2023/0029634 A1 | 2/2023 | Teeple |
| 2023/0058470 A1 | 2/2023 | Chandrashekar et al. |
| 2023/0061725 A1 | 3/2023 | Khan |
| 2023/0068099 A1 | 3/2023 | Abramenko et al. |
| 2023/0137931 A1 | 5/2023 | Song |
| 2023/0156085 A1 | 5/2023 | Yachiku |
| 2023/0221911 A1 | 7/2023 | Bandameedipalli |
| 2023/0252127 A1 | 8/2023 | Taylor |
| 2023/0254699 A1 | 8/2023 | Chaudhary |
| 2023/0319026 A1 | 10/2023 | Waltermann |
| 2023/0394127 A1 | 12/2023 | Tussy |
| 2023/0409761 A1 | 12/2023 | Nagar |
| 2024/0112597 A1 | 4/2024 | Kim |
| 2024/0127923 A1 | 4/2024 | Jaime |
| 2024/0144935 A1 | 5/2024 | Martin |
| 2024/0248592 A1 | 7/2024 | Zerhusen |
| 2024/0340185 A1 | 10/2024 | Cameron |
| 2025/0013642 A1 | 1/2025 | Yang |

FOREIGN PATENT DOCUMENTS

| | | |
|---|---|---|
| JP | 4808173 B2 | 11/2011 |
| JP | 2015-106406 A | 6/2015 |
| WO | 2023/220948 A1 | 11/2023 |

OTHER PUBLICATIONS

Naz, Sadaf et al., "A comprehensive review of federated learning for COVID-19 detection," International Journal of Intelligent Systems 37.3 (2022): 2371-2392. (22 Pages).

Prasser, Fabian, et al., "Efficient and effective pruning strategies for health data de-identification," BMC medical informatics and decision making 16.1 (2016): 1-14. (14 Pages).

"Speech Recognition," Web Accessibility Initiative. Web Page <https://www.w3.org/WAI/perspective-videos/voice/> accessed on Aug. 30, 2023 (6 Pages).

"Text Size," Web Accessibility Initiative. Web Page <https://www.w3.org/WAI/GL/low-vision-a11y-tf/wiki/Text_Size> accessed on Aug. 30, 2023 (5 Pages).

Mesko, Bertlan, "The Top 10 Health Chatbots," The Medical Futurist, Aug. 1, 2023, Web Page <https://medicalfuturist.com/top-10-health-chatbots/> accessed on Aug. 30, 2023 (11 Pages).

(56) References Cited

OTHER PUBLICATIONS

Longoni, Chiara et al., "AI Can Outperform Doctors. So Why Don't Patients Trust It?" Harvard Business Review, Oct. 30, 2019, Web Page <https://hbr.org/2019/10/ai-can-outperform-doctors-so-why-dont-patients-trust-it> accessed on Aug. 30, 2023 (7 Pages).

"Doctor Ai," DDXRX, Web Page <https://www.ddxrx.com/> accessed on Aug. 30, 2023 (7 Pages).

"Multi-Factor Authentication and Voice Biometrics," Voice Biometrics Group, Feb. 2021, Web Page <https://www.voicebiogroup.com/starting/multi-factor-authentication-and-voice-biometrics.html> accessed on Aug. 30, 2023 (6 Pages).

Wallace, Byron C et al. "Automatically annotating topics in transcripts of patient-provider interactions via machine learning." Medical decision making : an international journal of the Society for Medical Decision Making vol. 34,4 (2014): 503-12. doi:10.1177/0272989X13514777 (20 Pages).

"Medical Transcription Analysis with Machine Learning—Doctor/Patient Conversation Demo," Amazon Web Services, Jun. 16, 2021, Web Page <https://www.youtube.com/watch?v=f5HVIALG5g4> accessed on Aug. 30, 2023 (2 Pages).

Baxendale, Simran et al., "Performing medical transcription analysis with Amazon Transcribe Medical and Amazon Comprehend Medical," Amazon Web Services, May 8, 2020, Web Page <https://aws.amazon.com/blogs/machine-learning/performing-medical-transcription-analysis-with-amazon-transcribe-medical-and-amazon-comprehend-medical/> accessed on Aug. 30, 2023 (12 Pages).

Sullivan, Todd et al., "Speaker Identification and Geographical Region Prediction in Audio Reviews," Department of Computer Science, Stanford University, 2023 (4 Pages).

"Finding Local Destinations with Siri's Regionally Specific Language Models for Speech Recognition," Apple Machine Learning Research, Aug. 2018, Web Page <https://machinelearning.apple.com/research/regionally-specific-language-models> accessed on Aug. 30, 2023 (9 Pages).

Tyagi, Nemika et al., "Demystifying the Role of Natural Language Processing (NLP) in Smart City Applications: Background, Motivation, Recent Advances, and Future Research Directions." Wireless Personal Communications 130.2 (2023): 857-908. (52 Pages).

Alozie, Emeka, "The AI Surgeon's Assistant: How Generative AI is Revolutionizing the Operating Room," Apr. 20, 2023, Web Page <https://intuitivex.com/tpost/p7bhza9611-the-ai-surgeons-assistant-how-generative> accessed on Aug. 30, 2023 (9 Pages).

Gaitan, Michelle, "Researchers at UTSA use artificial intelligence to improve cancer treatment," University of Texas at San Antonio, Apr. 18, 2023, Web Page <https://www.utsa.edu/today/2023/04/story/researchers-use-artifical-intelligence-to-improve-cancer-treatments.html> accessed on Aug. 30, 2023 (4 Pages).

Bohr, Adam et al., "The rise of artificial intelligence in healthcare applications." Artificial Intelligence in Healthcare (2020): 25-60. doi:10.1016/B978-0-12-818438-7.00002-2 (37 Pages).

"Introducing Healthcare-Specific Large Language Models from John Snow Labs," KDnuggets, Apr. 28, 2023, Web Page <https://www.kdnuggets.com/2023/04/john-snow-introducing-healthcare-specific-large-language-models-john-snow-labs.html> accessed on Aug. 30, 2023 (7 Pages).

Balaskas, Georgios, et al., "An end-to-end system for transcription, translation, and summarization to support the co-creation process. A Health CASCADE Study", ACM PETRA '23, published Aug. 10, 2023, pp. 625-631. (Year: 2023) (7 Pages).

"FollowMyHealth®," Allscripts Healthcare Solutions Inc, Google Play Store, Web Page <https://play.google.com/store/apps/details?id=com.jardogs.fmhmobile&hl=en_US&gl=US> accesed on Jan. 8, 2023 (4 Pages).

D. Fedasyuk and I. Lutsyk, "Tools for adaptation of a mobile application to the needs of users with cognitive impairments," 2021 IEEE 16th International Conference on Computer Sciences and Information Technologies (CSIT), LVIV, Ukraine, 2021, pp. 321-324, doi: 10.1109/CSIT52700.2021.9648702. (Year: 2021).

\* cited by examiner

SYSTEM AND METHOD FOR MANAGING ACCESS TO DATA STORED IN A DATA MANAGEMENT SYSTEM

FIELD

Embodiments disclosed herein relate generally to data access management. More particularly, embodiments disclosed herein relate to systems and methods to manage access to data stored in a data management system.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
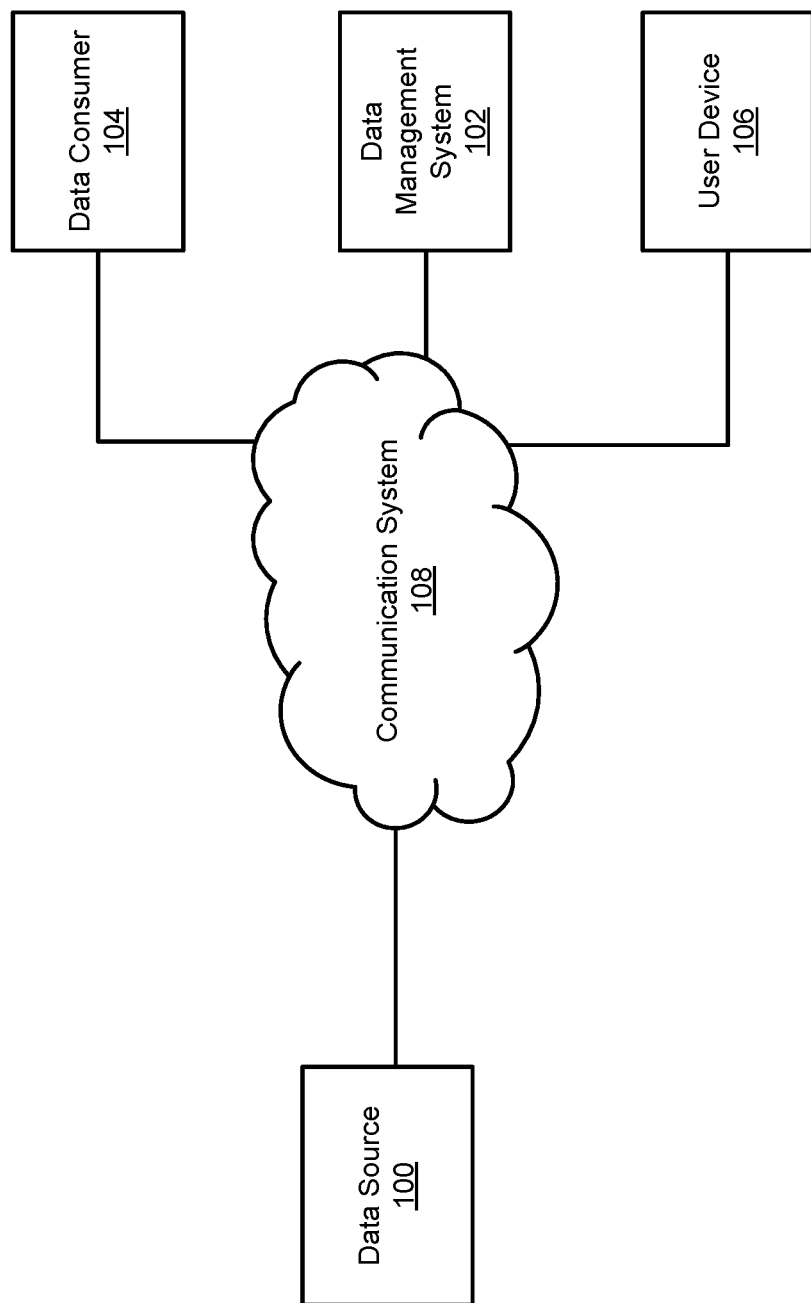
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data in a data management system. The data management system may collect, store, and/or otherwise manage data on behalf of an individual. The data may be relevant for use to a variety of data consumers.

For example, the data may be relevant for use by a person for which the data is collected (e.g., a data subject), by other persons that may provide services to the data subject (e.g., service providers), and/or other persons.

However, the data may include sensitive data for the data subject. For example, the data may include health information and/or other types of information that the data subject may not wish to have become generally available.

To manage and facilitate access to the data, the data may be managed using access control models. The access control models may provide varying levels of restriction on access to the data. The restrictions to access may be based on topics that are of interest to the data subject, and the data subject's level of interest in each of the topics.

Consequently, access to portions of the data may be granted to various persons without requiring explicit grants of access by the data subject.

By doing so, embodiments disclosed herein may facilitate access to data to a variety of persons in a manner that reduces a cognitive burden on data subject by removing the need for data subject to explicitly grant access to the data. Accordingly, access to portions of the data may be granted even while the data subject is unable to explicitly grant access to the data. Thus, embodiments disclosed herein may address, in addition to others, the technical problem of data access management. The disclosed embodiments may address this problem by automating the process of selectively granting access to data without requiring, in all cases, explicit grants of access by various persons.

In an embodiment, a method for managing access to data stored in a data management system is provided. The method may include obtaining a request for a portion of the data from a requestor; based on an identity of the requestor, performing an access control model selection process to identify an access control model of access control models usable to manage access to the data, the access control model defining actions to be performed by the data management system to provide a response to the request for the data; and providing, based on the identified access control model, a response to the requestor to service the request for the portion of the data.

The data may include a plurality of portions, and each portion of the plurality of portions is classified for relevancy to topics.

Each of the topics may be associated with an access control model of the access control models.

The access control model may be associated with each topic is based on a ranking of the topic.

A level of restrictiveness of the access control model may be associated with each topic is inversely proportional to the ranking of the topic.

The identity of the requestor may be associated with at least one topic of topics, and each topic may have a topic ranking of topic rankings, the topic rankings indicating a level of relevance for each of the topics.

In a first instance of the access control model selection process where the access control model is a first access control model of the access control models, providing the response may include screening the requestor from directly accessing the data; providing a list of a portion of the topics to the requestor; receiving a topic request from the requestor, the topic request specifying at least one topic from the list; based on the topic request, providing an authorization request to a user device; and based on a response to the authorization request from the user device, providing the portion of the data that is classified for the portion of the topics to the requestor; or providing a message to the requestor, the message indicating that none of the data is classified for the portion of the topics.

In a second instance of the access control model selection process where the access control model is a second access control model of the access control models, providing the response may include screening the requestor from directly accessing the data; screening the requestor from list of the portion of the topics; prior to providing any information to the requestor regarding the data, receiving an unprompted data request from the requestor; based on the unprompted data request, providing a second authorization request for the unprompted data to a user device; and based on a response to the second authorization request from the user device, providing the portion of the data to the requestor; or providing a message to the requestor, the message indicating that none of the data is relevant to the unprompted data request.

In a third instance of the access control model selection process where the access control model is a third access control model of the access control models, providing the response may include providing the requestor with direct access to the portion of the data.

Providing the direct access to the data may include providing the requestor with information regarding the portion of the data.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer-implemented services may include data management services, data storage services, data access and control services, database services, and/or any other type of service that may be implemented with a computing device.

The system may include data management system 102. Data management system 102 may provide all, or a portion, of the computer-implemented services. To provide the computer-implemented services, data may be stored in data management system 102. The data stored in data management system 102 may include data usable (i) by an individual for which the data is stored, (ii) by other individuals to assist the individual, and/or (iii) by other individuals for other types of use. For example, the data may include healthcare information for an individual and the data may be usable by other individuals such as healthcare providers to diagnose and/or treat the individual for various health conditions.

The data stored in data management system 102 may be collected from data source 100. While illustrated with respect to a single data source, the system of FIG. 1 may include any number of data sources through which data management system 102 may obtain data. Data source 100 may include hardware and/or software components configured to obtain data, store data, provide data to other entities, and/or to perform any other task to facilitate performance of the computer-implemented services.

For example, an individual's healthcare information may be obtained from a healthcare provider system (e.g., data source 100) for use by the individual and/or other individuals (via associated devices). The data collected from data source 100 may include any quantity, size, and type of data. The data may include, for example, an audio recording (e.g., audio file) of a conversation between an individual and a healthcare provider, digitized results of medical tests, etc.

By storing data in data management system 102, the aggregated data may be usable for a variety of purposes. For example, in the healthcare context, the data may be usable for diagnostic purposes, verification purposes (e.g., second opinions), to facilitate studies by third parties that may use the data, etc. While described with respect to the healthcare services context, it will be appreciated that data may be stored in data management system 102 for other purposes and/or with respect to other contexts. For example, the stored data may be relevant for other types of services, uses, etc. without departing from embodiments disclosed herein.

However, storing data in data management system 102 may consume limited storage resources available to data management system 102. For example, data management system 102 may have a finite amount of storage resources for storing data. If all of the storage resources are consumed, additional data may not be stored in data management system 102 thereby limited use of the data and computer implemented services provided with the data.

Additionally, the information included in data management system 102 may be usable by various persons. Various persons (e.g., doctors) may use the data to provide various services to a person for which the data is collected. However, the data may only be useful to the extent that these other persons may be able to access it. Consequently, if these various person are unable to access the data, the data may not provide utility to the person for which it is collected.

For example, if access to the data is restricted unless explicit authorization is granted by a manager of the data, the utility of the data may be frustrated if the manager is unavailable to grant access to the data.

In general, embodiments disclosed herein may provide methods, systems, and/or devices for managing limited storage capacity for and access to data in data management systems. To manage limited storage capacity, data management system 102 may limit the types and quantity of data stored in data management system 102. For example, data management system 102 may (i) identify portions of stored data for removal and/or deletion in order to free some of the limited storage capacity, (ii) proactively reject some portions of not-yet-stored data for storage to retain some of the limited storage capacity that is already free, and/or (iii) perform other types of storage space management actions with respect to various portions of data managed by data management system 102.

Data management system 102 may select the portions of data for performance of management actions on the basis of relevancy of the portions of data for one or more purposes. For example, some portions of the data stored in the data management system may be more relevant or helpful for an individual and/or other individuals (e.g., service providers such as medical professional) to provide services to the individual than other portions of the data stored in the data management system. Deletion of data that may include relevant information for an individual may be disadvantageous for the individual by reduce the ability of the desired services to be provided using the data managed by data management system 102. Therefore, data management system 102 may prioritize deletion of data based on the relevancy of the data for one or more purposes with respect to an individual.

In order to discriminate more relevant data from less relevant data, the data management system may analyze the data being collected and stored, audio recordings of interactions between the individual and other individuals that provide services (e.g., a purpose for the data) to the individual, and/or other types of data that may include content relevant to discerning purposes (e.g., topics) that are relevant to the individual for which the data is stored. For example, data management system 102 may analyze an audio recording of a conversation between an individual and a healthcare provider to identify medical conditions impacting the individual. Based on this identification, data management system 102 may establish topics that are relevant to the individual, and prioritize storage of data including and/or relating to the topics (e.g., in this example, diagnosis, treatment, etc. of these medical conditions) over storage of data relating to other topics.

As new information regarding the topics becomes available, the topics and relevancy ratings (e.g., some topics may be of higher relevancy) for the topics may be updated. Consequently, the topics for which storage of data is prioritized may be dynamically updated over time.

By dynamically updating the topics and relevancy rankings for the topics over time, embodiments disclosed herein may provide a storage system that is more likely to retain data that is more desirable to an individual, and purge other data that is less desirable to the individual. The disclosed embodiments may do so in an automated and/or semiautomated fashion thereby reduce a cognitive burden on an individual for managing the data stored in limited storage resources of data management system 102.

To facilitate access to the data, the data management system 102 may implement at least a semi-automated access control model. The access control model may automatically and/or semi-automatically grant access to various types of data in data management system 102 based, in part, on the topics that are identified as being relevant to the person for which the data is collected, relevancy rankings for the data, and/or other factors (e.g., types of person that are likely to provide utility to the person through access to the data). In this manner, access to the data may be facilitated under a variety of circumstances including, for example, incapacity of persons that manage operation of data management system 102. Thus, a manager of data management system 102 may not need to explicitly grant access to the data to various person through which utility of retaining the data may be obtained.

To provide the above noted functionality, the system of FIG. 1 may include data source 100, data management system 102, data consumer 104, user device 106, and communication system 108. Each of these components is discussed below.

Figure 2A:
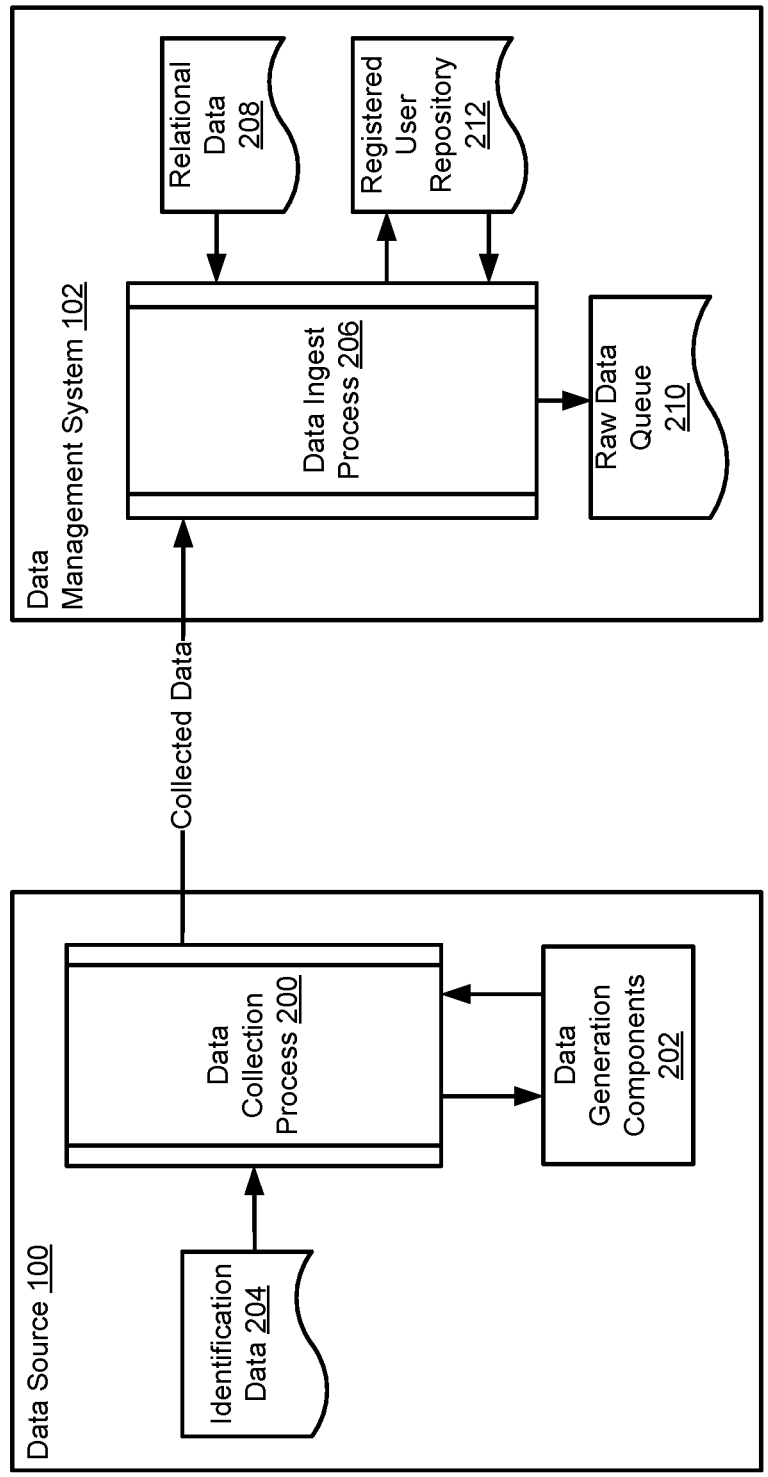
FIGS. 2A-2E show diagrams illustrating data flows in accordance with an embodiment.

Data source 100 may (i) facilitate collection and transmission of data (e.g., regarding and/or relating to an individual) to data management system 102, (ii) provide information identifying the individual or entity sourcing the data to data management system 102, and/or (iii) otherwise facilitate collection of data by data management system 102. Data source 100 may be include a system operated by a medical provider which may collect, store, and/or provide access to data for a patient or individual, a personal device that collects information about an individual (e.g., cellphone, smart watch, etc.), and/or another type of data collection device. While described with respect to a medical provider, it will be appreciated that data source 100 may provide data related to other purposes without departing from embodiments disclosed herein. Refer to FIG. 2A for additional details regarding obtaining data using data source 100.

Data source 100 may be managed by (i) an individual or a patient for which the data is being collected, (ii) professional individuals that may provide a service for an individual, and/or (iii) other individuals or entities that may provide services for an individual. For example, data source 100 may be implemented using a professional medical device and/or another device operated by a medical provider.

Figure 2B:
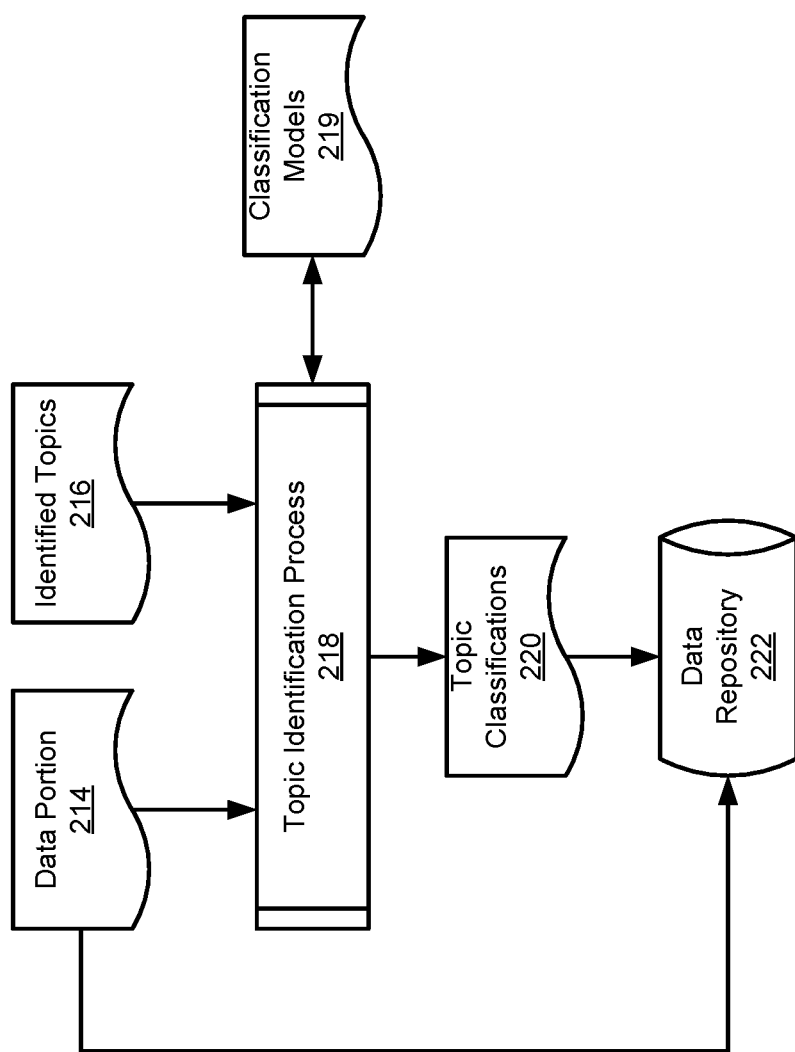
Figure 2C:
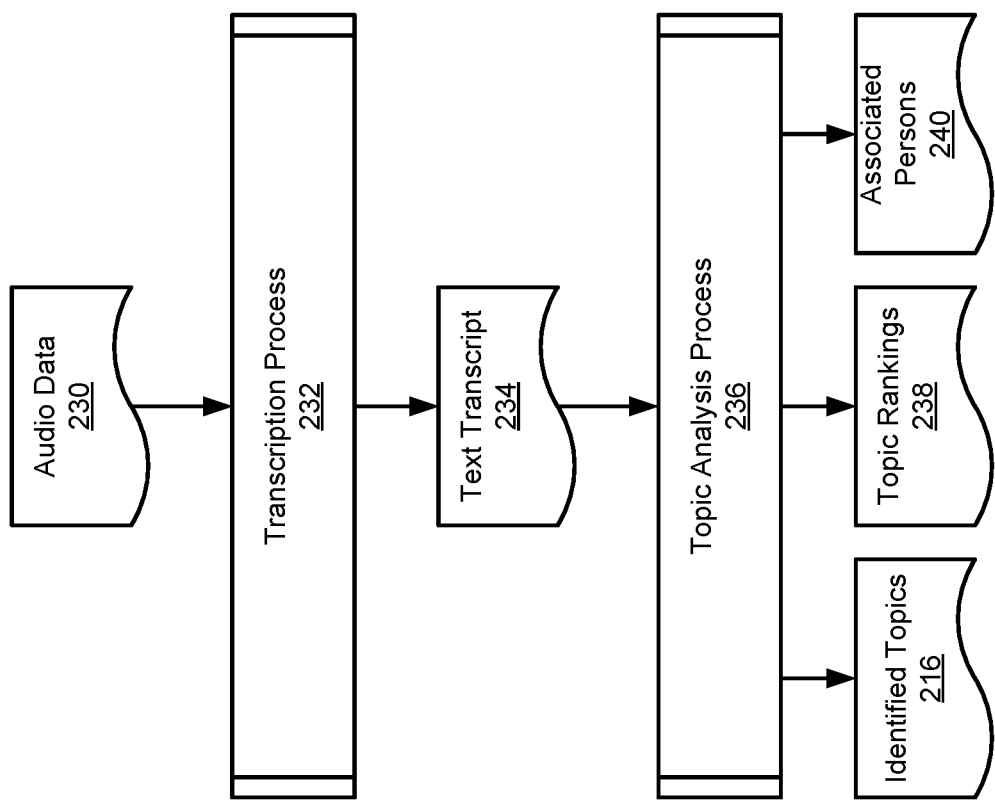

To manage storage of collected data, data management system 102 may (i) obtain data from data source 100, (ii) for audio data, perform a transcription process to obtain a text transcript of the audio data, (iii) perform an analysis of the text transcript of the data, (iv) based on the analysis of the text transcript, identify topic classifications and topic rankings for the topic classifications, (v) when new data is obtained, perform a topic identification process to identify a topic classification for the new data, (vi) selectively store or reject the new data for storage (e.g., depending on the topic classification and other factors) with an identifier based on the result of the topic identification process, and (vii) perform storage space management actions (e.g., based on topic classifications for stored data, topic rankings, and/or other factors) to manage storage space of data management system 102. Refer to FIGS. 2A-2C for additional details regarding storing data.

Figure 2D:
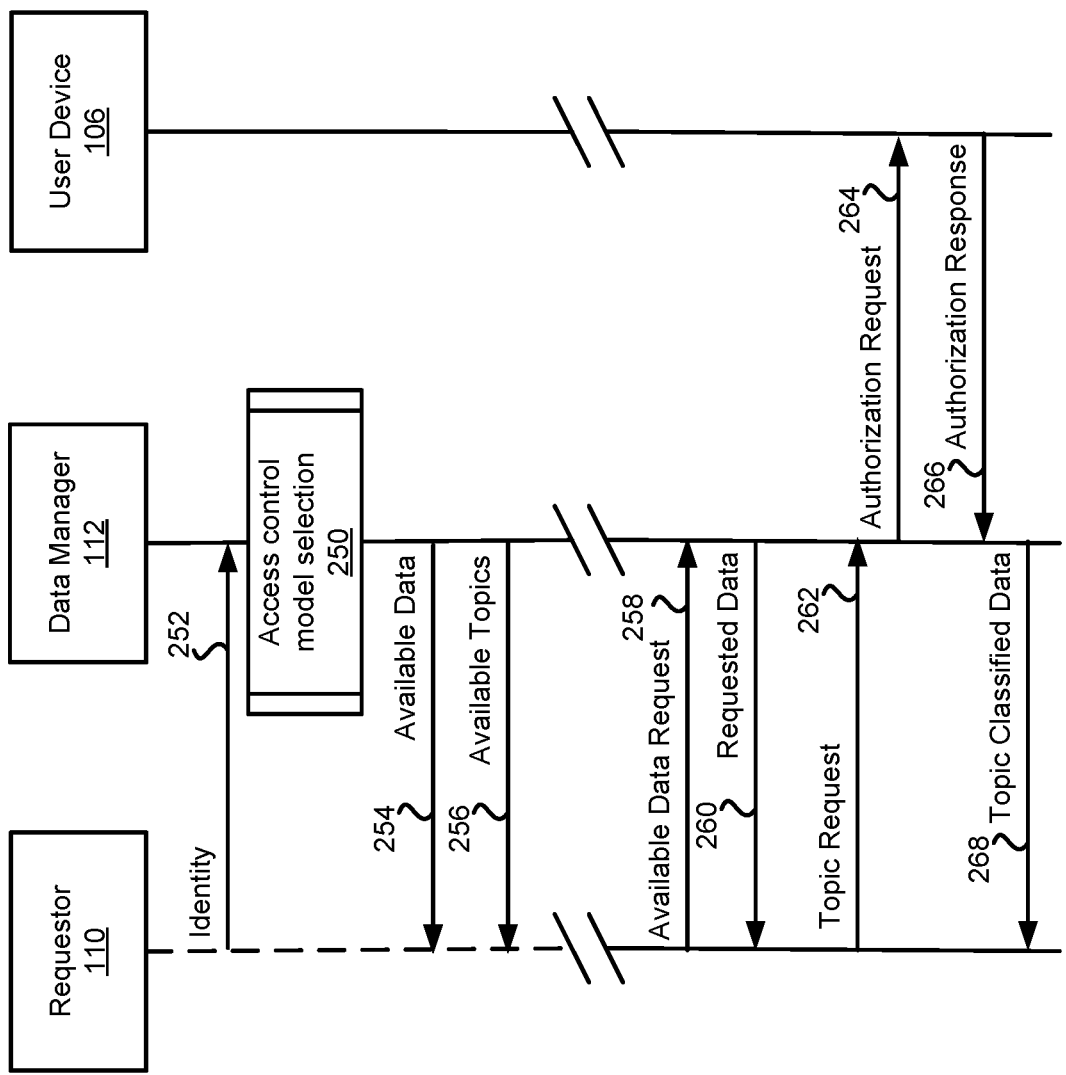

To manage storage space, data management system 102 may perform any number of storage space management actions, which may include (i) identifying when storage space is unavailable (and/or meets other criteria), (ii) identifying portion(s) of data to delete and/or portions of not yet stored data to discard without storing, and/or (iii) deleting the identified portion(s) of data. Similarly, data management system 102 may also provide access to stored data (e.g., to the individual for which the data is being managed and/or to data consumer 104). Refer to FIG. 2D for additional details regarding managing storage space.

Figure 2E:
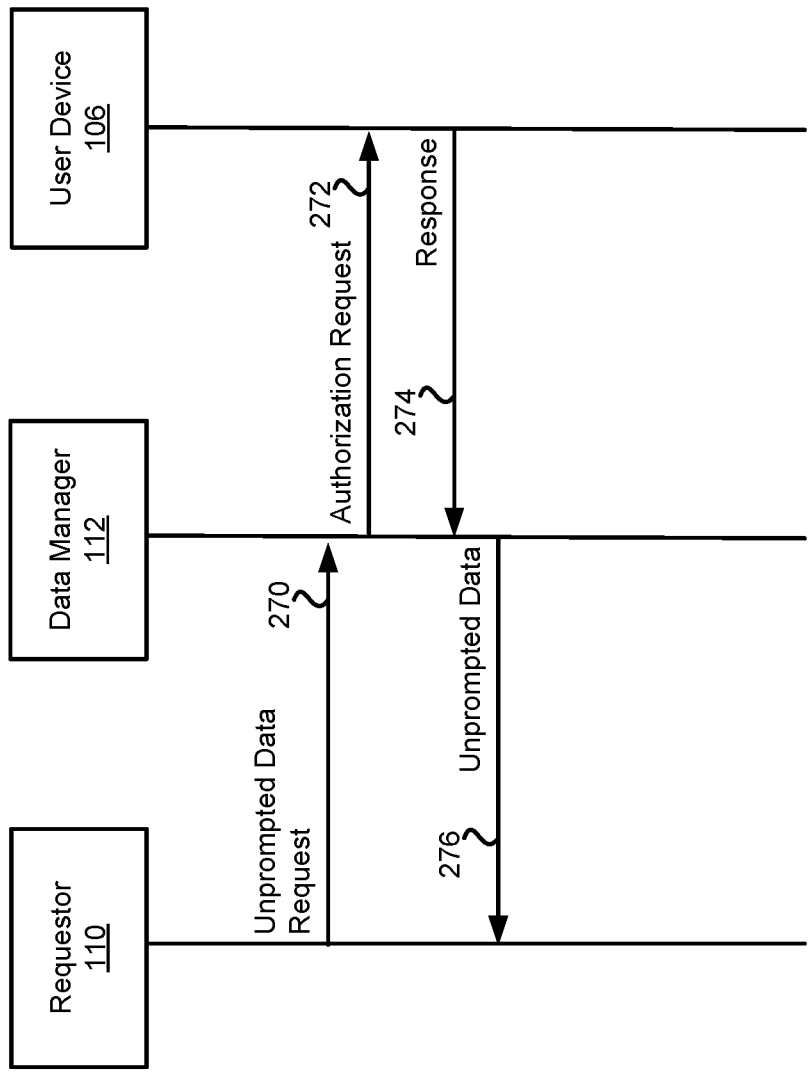

Data consumer 104 may (i) obtain limited access to selective portions of data stored in data management system 102, (ii) submit requests for access to data stored in data management system 102 by a third party or other individual, (iii) provide information identifying the individual or entity requesting access to the data and/or other types of information upon which decisions to grant access may be based, and/or (iv) once a request for access is granted (e.g., by user device 106), obtain access to data stored in data management system 102 (e.g., data for which access has been granted based on the submitted requests). Refer to FIGS. 2D-2E for additional information regarding automated and/or semi-automated grants of access to data.

User device 106 may facilitate (i) access and control over data stored in data management system 102 by an individual, (ii) explicit designation of portions of data for use by other individuals (e.g., data consumer 104), and/or (iii) performance of other management operations. The explicit designations may be separate from the automated and/or semi-automated grants of access discussed above. User device 106 may be registered with data management system 102. For example, data management system 102 may confirm the identity of user device 106 based on a registration of the device, the registration may indicate that user device 106 is being used by the user or individual.

When providing their functionality, any of data source 100, data management system 102, data consumer 104, and/or user device 106 may perform all, or a portion, of the methods shown in FIGS. 3A-3C.

Any of (and/or components thereof) data source 100, data management system 102, data consumer 104, and user device 106 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 108. In an embodiment, communication system 108 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, diagrams illustrating data flows implemented by a system over time in accordance with an embodiment are shown in FIGS. 2A-2D. In FIGS. 2A-2D, a first set of shapes (e.g., 204, 208) is used to represent data structures, a second set of shapes (e.g., 200, 206) is used to represent processes performed using data, and a third set of shapes (e.g., 226) is used to represent large scale data structures such as databases.

Turning to FIG. 2A, a first data flow diagram illustrating data flows, data processing, and/or other operations that may be performed by the system of FIG. 1 in accordance with an embodiment is shown. The data flows, data processing, and/or other operations may be performed when data is obtained from a data source. In FIG. 2A, example flows between data source 100 and data management system 102 are shown. It will be appreciated that similar data flow with respect to any devices (e.g., devices that may collect and transmit data to data management system 102 such as user device 106) and data management system 102 may be present.

To provide computer-implemented services, data management system 102 may obtain, store, and/or otherwise manage data for an individual. Data management system 102 may (i) obtain data from data source 100, and (ii) store some or all of the collected data for future use. However, data management system 102 may have a limited capacity for storing data. Consequently, data management system 102 may perform various storage space management processes over time, as discussed in greater detail with respect to FIGS. 2B-2D.

To obtain the data, data management system 102 and data sources 100 may cooperate with one another for data collection purposes.

To cooperate with data management system 102 for data collection purposes, data source 100 may perform data collection process 200. During data collection process 200, data may be (i) collected using data generation components 202, and (ii) provided all or a portion of the collected data (and/or derived data that is based at least in part on the collected data) to data management system 102.

Data generation components 202 may include software components and/or hardware components to collect data. For example, data generation components 202 may include sensors, generative components, and display components of data source 100. The display components may be used to display prompts to a user of data source 100 (e.g., to instruct a user how to participate in data collection processes). The generative components may be used to generate various stimulations (e.g., optical, audio, etc.) for the user (e.g., so that data may be collected). The sensors may be used to obtain information regarding the user and the impact of the stimulations on the user.

Once collected, the data may be prepared for transmission to data management system. To prepare the collected data for transmission, the data may be enriched with additional information by adding metadata. The metadata may include, for example, (i) information regarding how the data was collected, (ii) information regarding for which entity the data was collected such as a user for which data management system 102 manages data, (iii) collection time, and/or other information that may enhance the collected data.

To add the metadata, data source 100 may store information regarding the user. For example, data source 100 may store identification data 204. Identification data 204 may include information regarding the identity of the individual for which the collected data is regarding/relating to. For example, identifying information such as the individual's name, date of birth, and/or any other identifying information for the individual for which the data is regarding.

Identification data 204 may also include information regarding the identity of the user and/or entity operating data source 100. For example, identifying information such as the user's and/or entity's name, IP address, and/or any other information useful to identify the operator and/or manager of data source 100.

Once enhanced, the collected data and corresponding metadata may be provided to data management system 102.

To cooperate with data source 100 for data collection purposes, data management system 102 may perform data ingest process 206. During data ingest process 206, the collected data obtained from data source 100 may be (i) classified with respect to which user the collected data is associated, (ii) managed in accordance with user-based access controls, and (iii) queued in raw data queue 210 for additional processing. Refer to FIGS. 2B-2D for additional details regarding the additional processing that may be performed on collected data.

To classify the data with respect to a user, the metadata may specify the user for which the data was collected. The user specified by the metadata may checked against users listed in registered user repository 212. Registered user repository 212 may include information regarding users that received data management services from data management system 102. Thus, when collected data is obtained, it may be verified as being relevant to users using registered user repository 212 (if not relevant, it may be discarded).

To manage the collected data in accordance with access controls, access to the data may be at least partially restricted. The restrictions for access to the collected data may be specified by relational data 208. Relational data 208 may specify restrictions on access to data managed by data management system 102 on behalf of different users. For example, the users may specify limits on the ability of other entities to access data managed by data management system 102 on behalf of the users.

For example, relational data 208 may specify whether and to what extent a data consumer (e.g., 104) may access the data stored by data management system 102 on behalf of a user. The access controls may be granular, thereby allowing a user to control which data consumers are able to access different portions of data. The access controls for a user may be established on a topic by topic basis. Thus, access to data for a given consumer may be given on a topic basis thereby allowing a user to provide a data consumer with access to all, or a portion, of the data managed by data management system that is related to one or more topics. Refer to FIGS. 2B-2D for additional information regarding topics.

To prepare the collected data for additional processing, the collected data may be queued in raw data queue 210. Raw data queue 210 may be implemented as a first in first out queue, or other type of queue. Raw data queue 210 may buffer data until it is processed and stored for long term retention.

Turning to FIG. 2B, a second data flow diagram illustrating data flows, data processing, and/or other operations that may be performed by the system of FIG. 1 in accordance with an embodiment is shown. The data flows, data processing, and/or other operations may be performed when data is classified with respect to its relevancy to different topics.

As discussed above, the system may manage storage of data based on the relevancy of the data for one or more purposes with respect to an individual (e.g., for which the data is being collected and stored). To discriminate more relevant data from less relevant data, data management system 102 may classify the relevancy of data with respect to topics that are relevant to the individual.

To classify the collected data and/or stored data, topic identification process 218 may be performed. During topic identification process 218, portions of data (e.g., data portion 214) may be obtained from the raw data queue and/or data repository 222 (e.g., if re-classifying data). The portions of data may reflect discrete portions such as files.

Once obtained, data portion 214 may be classified with respect to certain topics that have been identified as being relevant to an individual. The topics that are relevant to the individual may be specified by identified topics 216. Refer to FIG. 2C for additional details regarding identifying topics that are relevant to different individuals.

To classify data portion 214 with respect to identified topics 216, various classification models 219 may be used. The classification models 219 may be implemented using, for example, inference models (e.g., decision trees, machine learning models, rules based systems, etc.). Classification models 219 may include any number of such inference models.

In an embodiment, at least some of the inference models are implemented by training a neural network to perform classification. The neural network may be trained using supervised learning, self-supervised learning, semi-supervised learning, and/or unsupervised learning. For example, with supervised learning, some number of instances of data may be hand-labeled by a subject matter expert or other person with respect to the topics (may be any number of topics, may include more topics than identified topics 216) for which the data is relevant to obtain a training data set. Once obtained, the training data set may be used to train the neural network (e.g., to set the weights of neurons and/or other features of the neural network).

In an embodiment, classification models 219 includes different models that are adapted to classify different types of data. For example, different inference models of classification models 219 may be adapted to handle images, text documents, tabular data sets, and/or other types of data, respectively.

In an embodiment, classification models 219 includes multiple different models that may be used to classify data portion 214. For example, data portion 214 may include different types of data. The inference models from classification models 219 may be used to identify topics for these different types of data, thereby identifying multiple topics to which data portion 214 may be relevant.

In an embodiment, at least one inference model from classification models 219 is trained to identify more than one topic for the ingested data. For example, the inference model may specify a range of different topics to which data portion 214 is relevant. The range of different topics may include a variety of topics that may be relevant to the individual and/or user for which the data is being stored in data management system 102.

To obtain topic classifications 220 for data portion 214, data portion 214 may be ingested by any of the models of classification models 219. The models may, as output, indicate any number of topics to which data portion 214 is relevant. The topics output by classification models 219 may be filtered against identified topics 216 to identify topic classifications 220. For example, if classification models 219 indicate that data portion 214 is relevant for the topics of "head", "neck", "balloons", and "tattoo", but identified topics 216 only specify the topics of "head" and "neck", then the topics "balloons" and "tattoo" may be filtered out resulting in topic classifications 220 only including the topics "head" and "neck".

Once topic classifications 220 are obtained, data portion 214 and topic classifications may be stored in data repository 222 for future use. Topic classifications 220 and data portion 214 may be associated with each other in data repository 222. Topic classifications 220 may be used, for example, to service future data access requests (e.g., occurrence of obtaining a request for data from a requestor) by facilitating identification of the topics for which data portion 214 is relevant.

However, as discussed above, to identify topic classifications 220, identified topics 216 (e.g., that are relevant to a user, purpose, etc.) may need to be available.

Turning to FIG. 2C, a third data flow diagram illustrating data flows, data processing, and/or other operations that may be performed by the system of FIG. 1 in accordance with an embodiment is shown. The data flows, data processing, and/or other operations may be performed to identify topics relevant to a user, the relevancy of the topics, and person or types of persons (e.g., data consumers) that may provide utility for data related to the topics.

To obtain identified topics 216, data including clues and/or other information usable to identify topics that are relevant may be collected. For example, audio recordings of interactions (e.g., conversations) between an individual (e.g., a user of the data management system) and other individuals that provide services (e.g., a purpose for the data) to the individual may be obtained. The resulting audio data 230—and/or other types of data that may include content relevant to discern purposes (e.g., topics) relevant to the individual for which the data is being collected and stored—may be used to identify topics relevant to the individual.

For example, audio data 230 may include an audio recording of a conversation between a patient and a medical provider in which the two people discuss diagnosis, treatment, etc. for a particular type of medical condition such as diabetes. The conversation may be analyzed to identify topics (e.g., medical conditions, medical tests, etc.) that are relevant to the patient.

In order to analyze audio data 230, transcription process 232 may be performed. During transcription process 232, audio data 230 may be transcribed to obtain text transcript 234. Transcription process 232 may be performed using an inference model (not shown), artificial intelligence model (AI model), natural language processing, and/or automated transcription modalities. For example, audio data 230 may be ingested by an inference model through which audio data 230 is analyzed and transcribed into a text format (e.g., text transcript 234).

Once text transcript 234 is obtained, topic analysis process 236 may be performed in order to obtain identified topics 216 and topic rankings 238. Identified topics 216 may, as noted above, indicate topics that are relevant to a user of the data management system, and topic rankings 238 may indicate a rank order of the topics indicated by the identified topics 216. The rank order may be with respect to relevancy of the topics to the user.

During topic analysis process 236, text transcript 234 may be analyzed to (i) identify topics relevant to a user, (ii) relative importance of each of the topics to the user, and (iii) identify individuals or persons relevant to one or more topics.

To identify topics relevant to the user, text transcript 234 may be analyzed via (i) automated textual analysis to identify frequency/number of occurrences of difference utterances (e.g., words, phrases, etc.) made during the conversation captured in audio data 230, (ii) inferencing using inference models, (iii) large language model based natural language processing, and/or other text analysis modalities. The resulting output of any of these analyzation techniques may include a list of (i) topics that arose during the conversation captured in audio data 230, (ii) frequencies/counts of the topics, (iii) levels of emphasis on the different topics made by the different participants in the conversation, (iv) participants in the conversation that brought up the topics during the conversation, (v) duration of time during the conversation each topic was the topic of the conversation, (vi) opinion polarity (e.g., positive, neutral, negative, etc.) of each topic identified in the data, and/or other information regarding the topics during the conversation.

Identified topics 216 may be established based on any of the aforementioned information obtained via analysis of text transcript 234. For example, identified topics 216 may include (i) all topics that met a minimum threshold of interest (e.g., brought up above a threshold number of times/met a duration of time requirement as the topic of conversation) during the conversation captured by audio data 230, (ii) a prescribed number of the topics that were of the highest interest, etc.

Topic rankings 238 may be established based on the level of interest in each of identified topics 216 identified based on the conversation captured by audio data 230. For example, topics rankings 238 may rank identified topics 216 based on the number of times, frequency of utterance, and/or other quantification regarding interest in each of identified topics 216.

For example, an AI model may analyze text data (e.g., text transcript 234) regarding medical diagnosis, treatment, etc. for an individual and identify features (e.g., certain group of text or words) related to diabetes (e.g., topic). As such, the AI model may establish the topic of diabetes to be relevant to the individual and assign a relevancy value to the topic of diabetes (e.g., topic rankings 238).

Associated persons 240 may be established based on the individual or persons associated with at least one of identified topics 216 identified based on the conversation captured by audio data 230. For example, associated persons 240 may classify individuals or persons based on the identified topics 216 in which the individual or person may be interested in. For example, an AI model may analyze text data (e.g., text transcript 234) regarding medical diagnosis, treatment, etc. for an individual and identify features (e.g., certain group of text or words) related to individuals who may provide medical services (e.g., endocrinologist) related to diabetes (e.g., topic). As such, the AI model may establish endocrinologist to be relevant to the topic of diabetes and assign an identifier for the associated persons (type of person such as a type of doctor) to the topic (e.g., associated persons 240).

Identified topics 216, topic rankings 238, and associated persons 240 may be stored in a data repository (not shown, may be data repository 222 shown in FIG. 2B) of data management system 102.

Over time, identified topics 216, topics rankings 238, and associated persons 240 may be updated as new data is collected (e.g., audio data 230). Continuing with the above example, additional audio data that captures a conversation during which a new topic (e.g., such as a new medical condition) is discussed may be obtained and analyzed. Doing so may increase a relevancy value (e.g., topic ranking) for the new topic when compared to the topic of diabetes.

Once obtained, identified topics 216, topic rankings 238, and associated persons 240 may be used to manage access to data stored in a data management system by discriminating individuals associated with less relevant data from individuals associated more relevant data in an automated manner.

To further clarify embodiments disclosed herein, interactions diagrams in accordance with an embodiment are shown in FIGS. 2D-2E. These interactions diagrams may illustrate how data may be obtained and used within the system of FIG. 1.

In the interaction diagrams, processes performed by and interactions between components of a system in accordance with an embodiment are shown. In the diagrams, components of the system are illustrated using a first set of shapes (e.g., 110, 112, etc.), located towards the top of each figure. Lines descend from these shapes. Processes performed by the components of the system are illustrated using a second set of shapes (e.g., 250, etc.) superimposed over these lines. Interactions (e.g., communication, data transmissions, etc.) between the components of the system are illustrated using a third set of shapes (e.g., 252, 264, etc.) that extend between the lines. The third set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 252 may occur prior to the interaction labeled as 254. However, it will be appreciated that the processes and interactions may be performed in different orders, any may be omitted, and other processes or interactions may be performed without departing from embodiments disclosed herein.

The lines descending from some of the first set of shapes (e.g., 110, 112, etc.) is drawn in dashing to indicate, for example, that the corresponding components may not be (i) operable, (ii) powered on, (iii) present in the system, and/or (iv) not participating in operation of the system for other reasons.

Turning to FIG. 2D, a first interaction diagram in accordance with an embodiment is shown. The first interaction diagram may illustrate processes and interactions that may occur during managing access to stored data in a data management system.

Now, consider an example scenario where requestor 110 (e.g., a data consumer) wishes to access data managed by data manager 112 (e.g., an active entities of a data management system, such as software that hosted by the data management system). To do so, the requestor may initiate contact with data manager 112.

At interaction 252, the identity of the requestor may be provided to data manager 112 by requestor 110. For example, the identity may be generated and provided to data manager 112 via (i) transmission via a message, (ii) storing in a storage with subsequent retrieval by data manager 112, (iii) via a publish-subscribe system where data manager 112 subscribes to updates from requestor 110 thereby causing a copy of the identity to be propagated to data manager 112, and/or via other processes. By providing the identity to data manager 112, data manager 112 may provide data access services by identifying an access control model based on the identity of the requestor (e.g., requestor 110). For example, a type of person that sent the identity may be ascertained based on the identity.

To manage access to data, access control model selection process 250 may be performed. During access control model selection process 250, a request for data (e.g., stored in data management system 102 on behalf of an individual) may be received from a requestor (e.g., requestor 110). Once received, data manager 112 may perform an analysis of the request for data to obtain (i) an identity of the requestor, (ii) information regarding the individual for which the request for data is regarding, (iii) and/or any other information necessary to perform access control model selection process 250.

Based on the analysis of the request for data, access control model selection process 250 may identify an access control model corresponding to the requestor (e.g., identity of the requestor). In some instances, the identity of a requestor may be associated with one or more topics (e.g., identified topics 216 shown in FIG. 2C) relevant to an individual and the one or more topics may be associated with an access control model. For example, data manager 112 may use an identity of a medical provider such as a cardiologist (e.g., requestor 110) as a key to perform a look up for any number of associated topics (e.g., heart, blood vessels, etc.) stored in, for example, a data repository (not shown) within data management system 102.

Once obtained, the identified topics associated with the requestor may be used, at least in part, during access control model selection process 250 to identify a relevancy ranking for each of the identified topics. In some instances, each topic (e.g., of the identified topics 216) may be associated with a topic ranking (e.g., topic rankings 238) indicating a level of relevance for each of the topics. Continuing the above example, data manager 112 may use the identified topics of "heart" and "blood vessels" as a key to perform a lookup for the corresponding topics rankings of the topics.

Based on identified topics and ranking of the identified topics, access control model selection process 250 may identify the access control model usable to manage access to the data by the requestor. In some instances, the access control model associated with each topic may be based on a ranking of the topic (e.g., topic rankings 238). For example, a first access control model associated with the topic of "diabetes" may be based on a higher ranking of relevance compared to other topics.

The level of restrictiveness of the access control model associated with each topic may be inversely proportional to the ranking of the topic. For example, the access control model associated with a higher ranked topic may include less restrictions to access the portion of data that is classified for the portion of the higher ranked topic.

For example, the data related to each topic that is associated with a type of person that sent the identity may be governed by one of three access control models.

The first access control model may grant unrestricted access to data that has been classified for that topic. For example, data manager 112 may automatically inform requestor 110 of all data classified for the topic that is available for access, and may allow unfettered access to the data.

The second access control model may grant topic-level access to data that has been classified for that topic. For example, data manager 112 may only inform requestor 110 that data related to the topic is available, and may provide access only to specifically requested data classified for that topic and which may be subject to approval for the data to be provided.

The third access control model may not generally grant access to data that has been classified for that topic. For example, data manager 112 may not inform requestor 110 that any data related to the topic is available, and may provide access only to specifically requested data classified for that topic and which may be subject to approval for the data to be provided.

Thus, based on the type of person identified based on the identity, the resulting access control model may provide (i) unfettered access to some data, (ii) topic level access to other data and access to data for which access is explicitly granted, and (iii) only access to data explicitly requested without prompting and for which access is explicitly granted At interaction 254, the available data obtained through access control model selection process 250 may be provided to requestor 110 by data manager 112. For example, the available data may include a list of data available (e.g., for access by the requestor 110) generated and provided to requestor 110 via (i) transmission via a message, (ii) storing in a storage with subsequent retrieval by requestor 110, (iii) via a publish-subscribe system where requestor 110 subscribes to updates from data manager 112 thereby causing a copy of the available data to be propagated to requestor 110, and/or via other processes. By providing the available data to requestor 110, requestor 110 may request access to portions of the available data managed by data management system 102.

At interaction 256, the available topics obtained through access control model selection process 250 may be provided to requestor 110 by data manager 112. For example, the available topics may include a list of a portion of the topics (e.g., associated with data stored in data management system) generated and provided to requestor 110 via (i) transmission via a message, (ii) storing in a storage with subsequent retrieval by requestor 110, (iii) via a publish-subscribe system where requestor 110 subscribes to updates from data manager 112 thereby causing a copy of the available topics to be propagated to requestor 110, and/or via other processes. By providing the available topics to requestor 110, requestor 110 may provide a topic request specifying at least one topic from the available topics in which access to the portion of data is requested.

At interaction 258, the available data request may be provided to data manager 112. For example, the available data request may be generated and provided to data manager 112 via (i) transmission via message, (ii) storing in a storage with subsequent retrieval by data manager 112, (iii) via a publish-subscribe system where data manager 112 subscribes to updates from requestor 110 thereby causing a copy of the available data requests to be propagated to data manager 112, and/or via other processes. By providing the available data requests to data manager 112, data manager 112 may identify the requested available data and provide the available data responsive to the available request.

At interaction 260, the requested data may be provided to requestor 110. For example, the requested data may be provided to requestor 110 via (i) transmission via message, (ii) storing in a storage with subsequent retrieval by requestor 110, (iii) via a publish-subscribe system where requestor 110 subscribes to updates from data manager 112 thereby causing a copy of the available data requests to be propagated to data manager 112, and/or via other processes. By providing the requested data to requestor 110, requestor 110 may receive the requested data for use by the requestor.

At interaction 262, the topic request may be provided to requestor 110. For example, the topic request may be generated and provided to data manager 112 via (i) transmission via message, (ii) storing in a storage with subsequent retrieval by data manager 112, (iii) via a publish-subscribe system where data manager 112 subscribes to updates from requestor 110 thereby causing a copy of the topic requests to be propagated to data manager 112, and/or via other processes. By providing the topic requests to data manager 112, data manager 112 may provide an authorization request to user device 106 to determine how data manager 112 responds to the topic requests.

At interaction 264, an authorization request may be provided to user device 106. For example, the authorization request may be generated and provided to user device 106 via (i) transmission via message, (ii) storing in a storage with subsequent retrieval by user device 106, (iii) via a publish-subscribe system where user device 106 subscribes to updates from data manager 112 thereby causing a copy of the authorization requests to be propagated to user device 106, and/or via other processes. By providing the authorization request to user device 106, user device 106 may provide a response to the authorization request in which the requested data relating to the topic(s) is provided or withheld from requestor 110.

At interaction 266, an authorization response may be provided to data manager 112 by user device 106. For example, the authorization response may be generated and provided to data manager 112 via (i) transmission via message, (ii) storing in a storage with subsequent retrieval by data manager 112, (iii) via a publish-subscribe system where data manager 112 subscribes to updates from user device 106 thereby causing a copy of the authorization responses to be propagated to data manager 112, and/or via other processes. By providing the authorization response to data manager 112, data manager 112 may provide a response to the topic request from requestor 110, which may indicate an explicit grant or rejection to the topic request.

At interaction 268, the topic classified data may be provided to requestor 110 by data manager 112. For example, the topic classified data may be provided to requestor 110 via (i) transmission via message, (ii) storing in a storage with subsequent retrieval by requestor 110, (iii) via a publish-subscribe system where requestor 110 subscribes to updates from data manager 112 thereby causing a copy of the topic classified data to be propagated to requestor 110, and/or via other processes. By providing the topic classified data to requestor 110, requestor 110, may provide services relevant to the topic classified data.

While described with respect to providing the topic classified data at interaction 268 in this example, it will be appreciated that if the authorization response received at interaction 266 was in the negative, access to the requested data may be denied rather than granted.

Turning to FIG. 2E, a second interaction diagram in accordance with an embodiment is shown. The second interaction diagram may be a continuation of the interaction diagram of FIG. 2D.

Continuing with the example from FIG. 2D, now, after the requestor has accessed the available data (e.g., unfettered access), and topic classified data, requestor 110 may also desire access to other data which may not be presented to requestor 110 by data manager 112.

To manage access to data, data manager 112 may perform access control model selection process 250 (shown in FIG. 2D). As previous discussed, during access control model selection process 250, data manager 112 may identify an access control model with a high level of restrictions on access to the data based on the identity of the requestor (e.g., requestor 110). As such, data manager 112 may screen requestor 110 from directly accessing some data and from receiving a list of the portion of the topics for the individual. In addition, data manager 112 may withhold information regarding some data from requestor 110.

Prior to providing any information to the requestor regarding some of the data stored for an individual (i.e., topics that are not associated with the type of the person that is requesting data), data manager 112 may manage an unprompted data request received from requestor 110.

At interaction 270, the unprompted data request may be provided to data manager 112 by requestor 110. For example, the unprompted data request may be generated and provided to data manager 112 via (i) transmission via a message, (ii) storing in a storage with subsequent retrieval by data manager 112, (iii) via a publish-subscribe system where data manager 112 subscribers to updates from requestor 110 thereby causing a copy of the unprompted data request to be propagated to data manager 112, and/or via other processes. By providing the unprompted data request to data manager 112, data manager 112 may provide data request management services for various devices such as requestor 110 by requesting authorization for a response to the unprompted data request. For example, the unprompted data request may request some data from data manager 112 for which data manager 112 has not provided requestor 110 with any information.

At interaction 272, the authorization request may be provided to user device 106 by data manager 112. For example, the authorization request may be generated and provided to user device 106 via (i) transmission via a message, (ii) storing in a storage with subsequent retrieval by user device 106, (iii) via a publish-subscribe system where user device 106 subscribes to updates from data manager 112, and/or via other processes. By providing the authorization request to user device 106, user device 106 may provide a response to the authorization request in which determines what actions are to be taken by data manager 112 in response to the unprompted data request.

At interaction 274, the response may be provided to data manager 112 by user device 106. The response may indicate whether authorization to provide access to data specified by the unprompted data request is granted by user device 106. For example, the response may be generated and provided to data manager 112 via (i) transmission via a message, (ii) storing in a storage with subsequent retrieval by data manager 112, (iii) via a publish-subscribe system where data manager 112 subscribes to updates from user device 106 thereby causing a copy of the response to be propagated to data manager 112, and/or via other processes. By providing the response to data manager 112, data manager 112 may provide data response services for unprompted data requests from various devices such as requestor 110.

Based on the interaction 274, the response may determine whether data manager 112 proceeds to interaction 276 or provides a message to requestor 110 indicating that none of the data (e.g., stored in data management system 102) is relevant to the unprompted data request.

At interaction 276, unprompted data may be provided to requestor 110 by data manager 112. For example, the unprompted data may be generated and provided to requestor 110 via (i) transmission via a message, (ii) storing in a storage with subsequent retrieval by requestor 110, (iii) via a publish-subscribe system where requestor 110 subscribes to updates from data manager 112 thereby causing a copy of the unprompted data to be propagated to requestor 110, and/or via other processes. By providing the unprompted data to requestor 110, requestor 110 may provide services related to the unprompted data.

It will be appreciated that unprompted data is provided in this example, because, in this example, the response from user device 106 indicated an explicit grant of access for the requested data.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processor to initiate performance of the processes. Any portions of the processes may be performed by the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Thus, using the data flows and processes shown in FIGS. 2A-2E, data access may be automatically managed via identifying an access control model based on the identity of the requestor. The identified access control model may define actions to be performed by the data management system in response to the request for data with the level of restrictiveness of the access control model being inversely proportional to the relevancy of a type of data.

Figure 3:
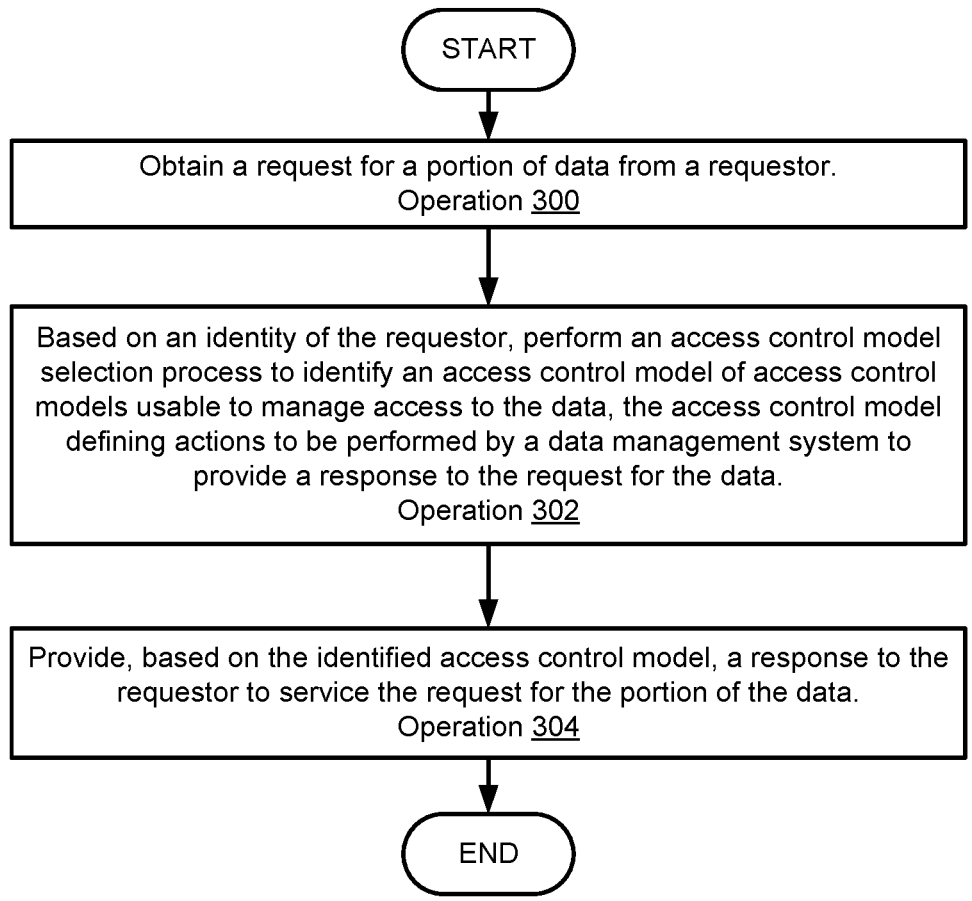
FIG. 3 shows a flow diagram illustrating a method of managing access to data in accordance with an embodiment.

As discussed above, the components of FIGS. 1-2E may perform various methods to manage operation of data processing systems. FIG. 3 illustrate methods that may be performed by the components of the system of FIGS. 1-2E. In the diagram discussed below and shown in FIG. 3, any of the operations may be repeated, performed in different orders, omitted, and/or performed in parallel with or in a partially overlapping in time manner with other operations.

Turning to FIG. 3, a flow diagram illustrating a method for managing access to data stored in a data management system in accordance with an embodiment is shown. The method may be performed, for example, by any of data source 100, data management system 102, data consumer 104, user device 106, and/or other components of the system shown in FIGS. 1-2E.

Prior to operation 300, a data management system may have obtained data for an individual and stored the data in a data repository within the data management system. The data may have been obtained through various processes such as generation, acquisition from external entity (e.g., medical provider), acquisition from the individual whose data is being stored, and/or by any other method. The data may include data relating to healthcare information for an individual (e.g., medical records) and/or topics discussed during conversations between a first person and a second person. The data may be classified and processed by the data management system based on topics (e.g., types of data) relevant to the individual.

To classify and process the data, the data management system may identify topics and topic rankings for the identified topics for an individual. The topics for the data may, as discussed above, be based at least in part on the topics discussed during the conversation between two people. The topics may include an enumeration of each unique topic of topics discussed during the conversation between two people. For example, an audio recording may include a conversation between a patient and a medical provider discussing a patient's diabetes diagnosis, treatment, etc. In this example, diabetes may be identified as the topic in which some portion of data obtained from a data source (e.g., medical provider system) may be associated.

The topic rankings may be based, at least in part, on instances of the topics discussed during a conversation between the two people. For example, a counter of the utterances for the topics, duration of conversation dedicated to each topic, and/or other quantifications may be derived from the conversation. The topic rankings may be based on these quantifications (e.g., more frequently uttered topics may be ranked more highly than less frequently uttered topics).

At operation 300, a request for a portion of data from a requestor may be obtained. The request for a portion of data may be obtained by (i) receiving the request via electronic communication from a third party and/or entity, (ii) reading the request from storage, (iii) obtaining user input that defines the requests, and/or via other methods. For example, a data management system or another entity may manage a portal (e.g., a website) through which the request for a portion of data may be submitted. The requesting individual or entity may provide the request via the portion using a personal electronic device, and/or other type of data processing system.

The request for a portion of data may include (i) an identity of the individual or entity requesting the portion of data, (ii) information regarding the individual for which the portion of data is regarding, and/or (iii) any other information necessary for responding to the request.

At operation 302, based on an identity of the requestor, an access control model selection process may be performed to identify an access control model of access control models usable to manage access to the data. The access control model may define actions to be performed by a data management system to provide a response to the request for the data.

The access control model selection process may be performed by (i) obtaining an identity of the requestor, (ii) based on the identity of the requestor, identifying at least one topic of topics associated with the requestor (e.g., a type of person), (iii) based on the identified topic(s) associated with the requestor, identifying a topic ranking for the identified topics(s), and/or (iv) selecting an access control model based on the identified topics and topic rankings for the topics.

The identity of the requestor may be obtained by (i) receiving an identifier or metadata from the requesting device via communication, (ii) reading the identity from storage, and/or (iii) by any other methods. The identity of the requestor may be associated with at least one topic of the topics identified during the topic analysis process by the data management system as discussed in FIG. 2C. For example, a cardiologist (e.g., the requestor) may be associated with at least one topic such as "heart".

The at least one topic of topics associated with the requestor may be identified by performing a look up or other type of parsing operation using an identifier of the requestor as a key to obtain an identifier for the at least one topic of the topics, and/or by any other method. The identities of the requestors may be stored in a searchable format keyed to different topics (e.g., types of data). For example, the data management system may be associated an identity of a requestor (e.g., cardiologist) with an identifier (e.g., heart related data) of the topics stored in the data management system.

Once the at least one topic of the topics is identified, the at least one topic may be used to identify the topic rankings associated with each of the identified topics. Each topic may be associated with a topic ranking. The topic rankings may indicate a level of relevance for each of the topics. For example, the data management system may use the identifier for "heart related data" (e.g., identified topic) to perform a look up process to obtain a ranking order for the topic. The topic of "heart related data" may be associated with higher relevance for one or more purposes by the individual for which the data is regarding.

Selecting an access control model based on the identified topics and topic rankings for the topics may be performed by matching the identified topics and topic rankings to the access control model. Each of the topics may be associated with an access control model and the access control model associated with each topic may be based on a ranking of the topic (e.g., topic ranking). Continuing the above example, the identified topic of "heart related data" may be a lower ranked topic of the topics and as such the data management system may identify a first access control model.

Each access control model of the access control models may include different levels of restrictiveness regarding access to data managed by the data management system. The level of restrictiveness for each access control model associated with each topic may be inversely proportional to the ranking of the topic. For example, the access control model associated with a more relevant topic (e.g., higher ranked topic) may incorporate less restrictions to access the portion of data by the requestor. Conversely, the access control model associated with a less relevant topic (e.g., lower ranked topic) may incorporate more restrictions to access the portion of data by the requestor.

At operation 304, based on the identified access control model, a response to the requestor to service the request for the portion of the data may be provided. The response to the requestor to service the request for the portion of the data may be provided in a manner as specified by the access control model identified by the data management system.

Providing the response in a first instance of the access control model selection process where the access control model is a first access control model of the access control models may include (i) screening the requestor from directly accessing the data, (ii) providing a list of a portion of the topics to the requestor, (iii) receiving a topic request from the requestor, (iv) based on the topic request, providing an authorization request to a user device, (v) based on a response to the authorization request from the user device, providing the portion of the data that is classified for the portion of the topics to the requestor or providing a message to the requestor that none of the data is classified for the portion of the topics.

Screening the requestor from directly accessing the data may be facilitated by blocking or restricting access to the data by the requestor. For example, data management system may restrict the requestor's access to the data managed by the data management system.

A list of a portion of the topics to the requestor may be provided by (i) sending a list of the topics (all or portions of the topics associated with the requestor) to the requesting individual or entity via communication by a data processing system, (ii) generating and providing an access code to the requestor (e.g., individual or entity requesting the data) in order to access the list of topics via portal (e.g., a website), (iii) and/or any other methods.

Receiving a topic request from the requestor may include receiving a topic request specifying at least one topic from the list via communication by a data processing system, via user input via portal (e.g., a website), and/or via any other methods. For example, the data management system may receive user input indicating a request for access to the topic of "heart related data".

The authorization request provided to the user device may include (i) an identifier for the topic responsive to the request as identified by the data management system, (ii) a prompt for user input to respond to the request, (iii) an identity of the individual or entity requesting the access to data related to the topic and/or any other information necessary for authorization.

Based on the response of the authorization request from the user device indicating authorization is granted, providing the portion of the data that is classified for the portion of the topics to the request. For example, data management system may determine that authorization is obtained and provide the portion of the data (e.g., classified for the portion of the topics which access has been granted) to the requesting individual or entity via communication by a data processing system.

Based on the response of the authorization request from the user device indicating authorization is denied, providing a message to the requestor indicating that none of the data is classified for the portion of the topics. For example, data management system may determine that authorization is not granted and send a message (e.g., specifying that none of the data stored in data management system is classified for the requested topics) to the requestor via communication by a data processing system.

Operation 304 may include providing a response in a second instance of the access control model selection process where in the access control model is a second access control model of the access control models may include: (i) screening the requestor from directly accessing the data, (ii) screening the requestor from list of the portion of the topics, (iii) prior to providing any information to the requestor regarding the data, receiving an unprompted data request from the requestor, (iv) based on the unprompted data request, providing a second authorization request for the unprompted data to a user device, and/or (v) based on a response to the second authorization request from the user device, providing the portion of the data to the requestor or providing a message to the requestor that none of the data is relevant to the unprompted data request.

Screening the requestor from directly accessing the data may be facilitated by blocking or restricting access to the data by the requestor. For example, data management system may restrict the requestor's access to the data managed by the data management system. Screening the requestor from the list of the portion of the topics may be facilitated by blocking or restricting access to the list of the topics (or a portion of the topics) by the requestor. For example, the data management system may not provide the list of the portion of the topics to the requestor.

Prior to providing any information to the requestor regarding the data, an unprompted data request from the requestor may be received. The unprompted data request may include information regarding the requested data and/or other types of information usable to request data for an individual. The unprompted data request may be received from a requestor without any prompts or information being shared by the data management system. For example, the unprompted data request may include a request to access data that is classified for a portion of topics not associated with the requestor.

Based on the unprompted data request, a second authorization request for the unprompted data may be provided to the user device. The second authorization request for the unprompted data may include (i) an identifier for the data responsive to the unprompted data request as identified by the data management system, (ii) a prompt for user input to respond to the request, (iii) an identity of the individual or entity requesting the access to data and/or any other information necessary for authorization.

Based on the response of the second authorization request from the user device indicating authorization is granted, providing the portion of the data to the requestor. For example, data management system may determine that authorization is obtained and provide the portion of the data (e.g., the portion of the data which access has been granted) to the requesting individual or entity via communication by a data processing system.

Based on the response of the second authorization request from the user device indicating authorization is denied, providing a message to the requestor indicating that none of the data is relevant to the unprompted data request. For example, data management system may determine that authorization is not granted and send a message (e.g., specifying that none of the data stored in data management system is relevant to the unprompted data request) to the requestor via communication by a data processing system.

Operation 304 may further include providing a response in a third instance of the access control model selection process where the access control model is a third access control model of the access control models may include providing the requestor with direct access to the portion of the data. Providing the direct access to the data may include providing the requestor with information regarding the portion of the data. Information regarding the portion of the data may be provided by (i) sending the information to the requestor via communication by a data processing system, (ii) generating an access code for the requestor in order to access the portion of the data via portal (e.g., a website), (iii) and/or any other methods.

The method may end following operation 304.

Using the methods illustrated in FIG. 3, embodiments disclosed herein may facilitate data access management for data stored in a data management system. Data access management may include identifying an access control model to manage a requestors access to a portion of data based on the identity of the requestor and the relevancy of the data to the individual for which the data is regarding.

Figure 4:
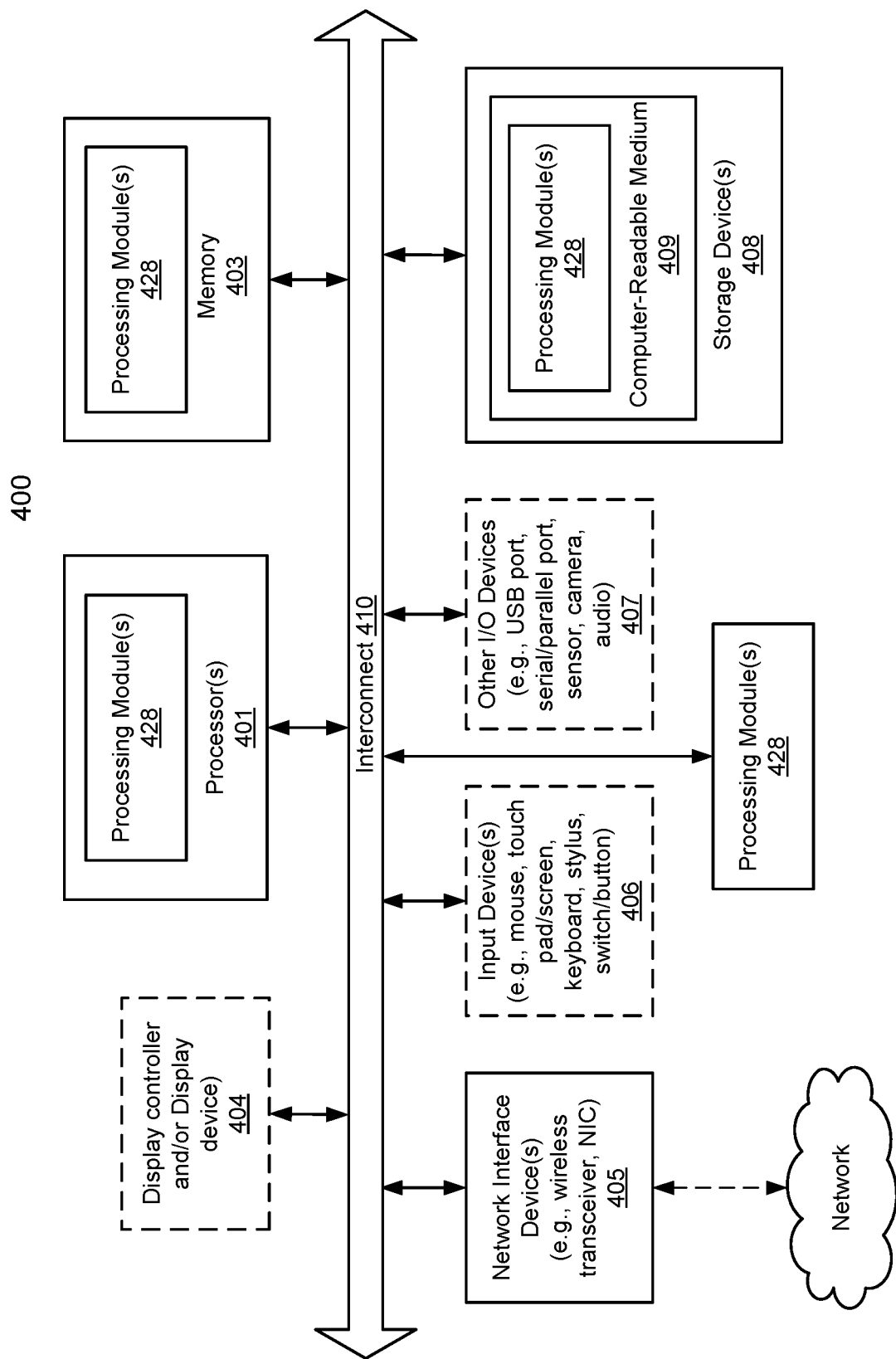
FIG. 4 shows a block diagram illustrating a data processing system in accordance with an embodiment.

Any of the components illustrated in FIGS. 1-2E may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing access to data stored in a data management system, the method comprising:
   prior to the data being stored in the data management system:
      obtaining the data as unprocessed data;
      generating topic classifications for the data by at least:
         generating a first set of topics for the data using a classification model hosted by the data management system, the classification model being a machine learning model;
         identifying different topics in at least one conversation between at least an owner of the data and another individual to generate a second set of topics for the data, the data being based on the at least one conversation; and
         before storing the topic classifications with the data in the data management system, removing from the first set of topics any topics not included in the second set of topics to obtain an updated first set of topics, the updated first set of topics being stored with the data in the data management system as the topic classifications for the data;
      generating identities for the data;
      associating each of the identities with at least one of the topic classifications; and
      using the topic classifications to associate the data with one or more access control models, each of the one or more access control models defining actions to be performed by the data management system to provide a response to one or more requests for the data;
   storing the data along with the topic classifications, the identities, and the association between the data with the one or more access control models in the data management system as processed data; and
   after the data is stored in the data management system as the processed data:
      determining whether to grant access to the data by at least:
         obtaining a request for a portion of the data from a requestor, the request comprising an identity of the requestor and the identity of the requestor corresponds to at least one of the identities;
         performing an access control model selection process to identify an access control model of the one or more access control models by matching the identity of the requestor to at least one of the identities; and
         providing, based on the identified access control model, a response to the requestor to transmit the portion of the data to the requestor or deny the requestor access to the portion of the data; and dynamically managing finite storage resources of the data management system by at least:
  detecting in real time that a change has occurred to the topic classifications of the data, the change causing the data to become more or less relevant for the owner of the data that is using the finite storage resources of the data management system;
  determining, based on the change, whether the data should be retained in or purged from the data management system such that the finite storage resources of the data management system can be used for other data of the owner that is more relevant to the owner than the data; and
  retaining the data in the data management system or purging the data from the data management system based on a result of the determination.

2. The method of claim 1, wherein the data comprises a plurality of portions, and each portion of the plurality of portions is classified for relevancy to the topic classifications.

3. The method of claim 2, wherein the access control model associated with each of the topic classifications is based on a ranking of each of the topic classifications.

4. The method of claim 3, wherein a level of restrictiveness of the access control model associated with each topic is inversely proportional to the ranking of each of the topic classifications.

5. The method of claim 1, wherein in a first instance of the access control model selection process where the access control model is a first access control model of the one or more access control models, providing the response comprises:
  screening the requestor from directly accessing the data;
  providing a list of a portion of topics to the requestor, each topic in the list corresponds to at least one of the topic classifications of the data;
  receiving a topic request from the requestor, the topic request specifying at least one topic from the list;
  based on the topic request, providing an authorization request to a user device for the portion of the data requested by the user; and
  based on a response to the authorization request from the user device,
    providing the portion of the data that is classified for the portion of the topics to the requestor; or
    providing a message to the requestor, the message indicating that none of the data is classified for the portion of the topics.

6. The method of claim 5, wherein in a second instance of the access control model selection process where the access control model is a second access control model of the one or more access control models, providing the response comprises:
  screening the requestor from directly accessing the data;
  screening the requestor from the list of the portion of the topics;
  prior to providing any information to the requestor regarding the data, receiving an unprompted data request from the requestor;
  based on the unprompted data request, providing a second authorization request for the unprompted data to a user device; and
  based on a response to the second authorization request from the user device, providing the portion of the data to the requestor; or
  providing a message to the requestor, the message indicating that none of the data is relevant to the unprompted data request.

7. The method of claim 6, wherein in a third instance of the access control model selection process where the access control model is a third access control model of the one or more access control models, providing the response comprises:
  providing the requestor with direct access to the portion of the data.

8. The method of claim 7, wherein providing the direct access to the data comprises:
  providing the requestor with information regarding the portion of the data.

9. The method of claim 1, wherein storing the data along with the topic classifications, the identities, and the association between the data with the one or more access control models in the data management system as the processed data comprises:
  rejecting, before the data is actually stored in the data management system as the processed data, a first portion of the data based on the topic classifications associated with the first portion of the data; and
  storing only a second portion of the data that is left over after the first portion is rejected as the processed data.

10. The method of claim 1, wherein generating the topic classifications and the identities for the data comprises:
  generating the identities based on identifying information associated with each participant involved in the at least one conversation.

11. The method of claim 1, wherein the change to the topic classifications is detected at least when at least new information associated with the data is obtained by the data management system, the new information being at least one of new data to be stored into the data management system or new conversations involving the owner of the data.

12. The method of claim 11, wherein detecting in real time that the change has occurred to the topic classifications of the data further comprises:
  determining, based on the new information associated with the data, a change in a level of relevancy of each of the topic classifications to the owner of the data.

13. A non-transitory machine-readable medium having instructions stored therein, which when executed by a processor, cause the processor to perform operations for managing access to data stored in a data management system, the operations comprising:
  prior to the data being stored in the data management system:
    obtaining the data as unprocessed data;
    generating topic classifications for the data by at least:
      generating a first set of topics for the data using a classification model hosted by the data management system, the classification model being a machine learning model;
      identifying different topics in at least one conversation between at least an owner of the data and another individual to generate a second set of topics for the data, the data being based on the at least one conversation; and
      before storing the topic classifications with the data in the data management system, removing from the first set of topics any topics not included in the second set of topics to obtain an updated first set of topics, the updated first set of topics being stored with the data in the data management system as the topic classifications for the data;

generating identities for the data;
associating each of the identities with at least one of the topic classifications; and
using the topic classifications to associate the data with one or more access control models, each of the one or more access control models defining actions to be performed by the data management system to provide a response to one or more requests for the data;
storing the data along with the topic classifications, the identities, and the association between the data with the one or more access control models in the data management system as processed data; and
after the data is stored in the data management system as the processed data:
determining whether to grant access to the data by at least:
obtaining a request for a portion of the data from a requestor, the request comprising an identity of the requestor and the identity of the requestor corresponds to at least one of the identities;
performing an access control model selection process to identify an access control model of the one or more access control models by matching the identity of the requestor to at least one of the identities; and
providing, based on the identified access control model, a response to the requestor to transmit the portion of the data to the requestor or deny the requestor access to the portion of the data; and
dynamically managing finite storage resources of the data management system by at least:
detecting in real time that a change has occurred to the topic classifications of the data, the change causing the data to become more or less relevant for the owner of the data that is using the finite storage resources of the data management system;
determining, based on the change, whether the data should be retained in or purged from the data management system such that the finite storage resources of the data management system can be used for other data of the owner that is more relevant to the owner than the data; and
retaining the data in the data management system or purging the data from the data management system based on a result of the determination.

14. The non-transitory machine-readable medium of claim 13, wherein the data comprises a plurality of portions, and each portion of the plurality of portions is classified for relevancy to the topic classifications.

15. The non-transitory machine-readable medium of claim 14, wherein the access control model associated with each of the topic classifications is based on a ranking of each of the topic classifications.

16. The non-transitory machine-readable medium of claim 15, wherein a level of restrictiveness of the access control model associated with each topic is inversely proportional to the ranking of each of the topic classifications.

17. A data processing system, comprising:
a processor; and
a memory coupled to the processor to store instructions, which when executed by the processor, cause the processor to perform operations for managing access to data stored in a data management system, the operation comprising:
prior to the data being stored in the data management system:
obtaining the data as unprocessed data;
generating topic classifications for the data by at least:
generating a first set of topics for the data using a classification model hosted by the data management system, the classification model being a machine learning model;
identifying different topics in at least one conversation between at least an owner of the data and another individual to generate a second set of topics for the data, the data being based on the at least one conversation; and
before storing the topic classifications with the data in the data management system, removing from the first set of topics any topics not included in the second set of topics to obtain an updated first set of topics, the updated first set of topics being stored with the data in the data management system as the topic classifications for the data;
generating identities for the data;
associating each of the identities with at least one of the topic classifications; and
using the topic classifications to associate the data with one or more access control models, each of the one or more access control models defining actions to be performed by the data management system to provide a response to one or more requests for the data;
storing the data along with the topic classifications, the identities, and the association between the data with the one or more access control models in the data management system as processed data; and
after the data is stored in the data management system as the processed data:
determining whether to grant access to the data by at least:
obtaining a request for a portion of the data from a requestor, the request comprising an identity of the requestor and the identity of the requestor corresponds to at least one of the identities;
performing an access control model selection process to identify an access control model of the one or more access control models by matching the identity of the requestor to at least one of the identities; and
providing, based on the identified access control model, a response to the requestor to transmit the portion of the data to the requestor or deny the requestor access to the portion of the data; and
dynamically managing finite storage resources of the data management system by at least:
detecting in real time that a change has occurred to the topic classifications of the data, the change causing the data to become more or less relevant for the owner of the data that is using the finite storage resources of the data management system;
determining, based on the change, whether the data should be retained in or purged from the data management system such that the finite storage resources of the data management system can be used for other data of the owner that is more relevant to the owner than the data; and
retaining the data in the data management system or purging the data from the data management system based on a result of the determination.

18. The data processing system of claim 17, wherein the data comprises a plurality of portions, and each portion of the plurality of portions is classified for relevancy to the topic classifications.

19. The data processing system of claim 18, wherein the access control model associated with each of the topic classifications is based on a ranking of each of the topic classifications.

20. The data processing system of claim 19, wherein a level of restrictiveness of the access control model associated with each topic is inversely proportional to the ranking of each of the topic classifications.

* * * * *

UNITED STATES PATENT AND TRADEMARK OFFICE
CERTIFICATE OF CORRECTION

| | | |
|---|---|---|
| PATENT NO. | : 12,481,781 B2 | Page 1 of 1 |
| APPLICATION NO. | : 18/458385 | |
| DATED | : November 25, 2025 | |
| INVENTOR(S) | : Prem Pradeep Motgi et al. | |

It is certified that error appears in the above-identified patent and that said Letters Patent is hereby corrected as shown below:

In the Claims

Claim 5, Column 27, Line 36, the word "cach" should instead read -- each --.

Claim 13, Column 28, Line 58, the word "sct" should instead read -- set --.

Claim 17, Column 30, Line 17, the word "sct" should instead read -- set --.

Signed and Sealed this
Twenty-seventh Day of January, 2026

John A. Squires
*Director of the United States Patent and Trademark Office*